(12) United States Patent
Larkin et al.

(10) Patent No.: US 8,473,119 B2
(45) Date of Patent: Jun. 25, 2013

(54) OPTIMAL GUIDANCE BLENDER FOR A HOVERING/FLYING VEHICLE

(75) Inventors: Louis Joseph Larkin, Palm Beach Gardens, FL (US); Eugene Angelo Petrino, Jupiter, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 741 days.

(21) Appl. No.: 12/210,562

(22) Filed: Sep. 15, 2008

(65) Prior Publication Data

US 2010/0070105 A1    Mar. 18, 2010

(51) Int. Cl.
*G05D 1/00*    (2006.01)

(52) U.S. Cl.
USPC ............................. 701/3; 244/75.1; 244/4 R

(58) Field of Classification Search
USPC .................... 701/1–4; 702/182; 244/75.1, 4 R
See application file for complete search history.

(56) References Cited

U.S. PATENT DOCUMENTS

| | | |
|---|---|---|
| 3,594,554 A | 7/1971 | Pederson et al. |
| 3,914,584 A | 10/1975 | Pietras et al. |
| 4,301,761 A | 11/1981 | Fry et al. |
| 4,538,230 A | 8/1985 | Reust et al. |
| 4,986,204 A | 1/1991 | Yoshida |
| 5,053,969 A | 10/1991 | Booth |
| 5,121,702 A | 6/1992 | Johnson et al. |
| 5,687,670 A | 11/1997 | Rice, IV |
| 7,159,817 B2 * | 1/2007 | VanderMey et al. .......... 244/12.1 |
| 7,565,876 B2 * | 7/2009 | Wilson et al. .................. 114/122 |
| 7,908,044 B2 * | 3/2011 | Piasecki et al. ..................... 701/4 |
| 2002/0056314 A1 * | 5/2002 | Kumagai et al. ................ 73/116 |
| 2004/0014558 A1 * | 1/2004 | Ibamoto et al. .................. 477/45 |
| 2004/0256165 A1 * | 12/2004 | Tomita et al. ................. 180/65.2 |
| 2006/0276999 A1 * | 12/2006 | Beck et al. ..................... 702/182 |

OTHER PUBLICATIONS

K. Bordignon et al., "Control Allocation for the X-35B", 2002 Biennial International Powered Lift Conference and Exhibit; Nov. 5-7, 2002, Williamsburg, VA.; pp. 1-10; American Institute of Aeronautics and Astronautics.

* cited by examiner

*Primary Examiner* — Thomas Black
*Assistant Examiner* — Shardul Patel
(74) *Attorney, Agent, or Firm* — Whitham, Curtis, Christofferson & Cook, P.C.

(57) ABSTRACT

For a vehicle having thrusters and control surfaces or other types of effectors having different cost of use and/or effectiveness as a function of vehicle speed, errors in position relative to an asserted control command are apportioned between errors of translational rate and pointing error as a function of speed in the vertical and/or horizontal planes and guidance commands are adjusted accordingly to produce commands that provide an optimal attitude for guidance of the vehicle through an arbitrary maneuver. The commands thus generated are then preferably apportioned between various available effectors to execute the maneuver most efficiently.

20 Claims, 5 Drawing Sheets

OPTIMAL GUIDANCE BLENDER FOR A HOVERING/FLYING VEHICLE

BACKGROUND OF THE INVENTION

1. Field of the Invention

The present invention generally relates to control of vehicles which may be operated in both hovering and flying operational modes or regimes and a transitional mode between them and, more particularly, to providing optimal unified guidance control in the transition region as well as in the hovering and flying modes.

2. Description of the Prior Art

Many types of vehicles are known for transporting equipment and/or personnel to desired locations in various environments for which they are, generally, specially adapted. One broad category of such vehicles is adapted to operate through and immersed in a fluid medium such as air or water including undersea vehicles and so-called lighter-than-air aircraft or where the weight of the vehicle is balanced by lift from surfaces which move relative to the vehicle such that movement of the vehicle is not required to produce such lift and as in helicopters, so-called ground effect vehicles and the like. Accordingly, such vehicles are capable of operating in both a flying mode or regime and a hovering mode or regime.

In a flying regime, such a vehicle utilizes control surfaces to generate forces against the surrounding fluid medium and thus point the vehicle along a desired path while the vehicle is being propelled in a given direction, generally axially of the vehicle. The efficacy of control surfaces generally diminishes with diminishing relative speed of the vehicle relative to the fluid medium but can be reasonably efficient to fairly low speeds. In contrast, in a hovering regime where the vehicle is substantially stationary, maneuvering is generally accomplished by thrusters which develop forces to move the vehicle in a desired direction or orient it to a desired attitude which may be substantially arbitrary with reference to the vehicle (e.g. along or around any of three orthogonal axes—only motion around two such axes corresponding to pitch and yaw resulting in or being analogous to pointing in a flying mode although roll may be used in conjunction therewith). The efficacy and efficiency of thrusters to provide guidance of the vehicle diminishes rapidly with increasing speed while, in sharp contrast with deflection of control surfaces in a relatively flowing medium, substantial energy is required to provide thrust forces. While their respective modes and principles of operation and relative effectiveness under various conditions are very different, the ultimate function of both control surfaces and thrusters is to develop forces and moments to alter the position and/or attitude of a vehicle and thus control surfaces and thrusters are collectively referred to as effectors.

Control of control surfaces and control of thrusters to cause a desired change in position or attitude of a vehicle are fundamentally different and, in the past, have been separately controlled through separate systems in response to separate operator inputs. Therefore, there has been a significant and frequently encountered possibility of seeking to control the vehicle through the wrong mode; the correct mode often being ambiguous due to, for example, variable currents in the fluid medium imparting virtual velocity to the vehicle when the vehicle position is substantially stationary or vice-versa. That is, a "flying" vehicle relies on forces developed by control surfaces moving through a fluid medium to alter vehicle attitude and thus uses attitude commands to effect guidance while a hovering vehicle relies upon thrusters to control both vehicle attitude and translation rate but uses translation rate to effect vehicle guidance. Control of the vehicle in either of these regimes is straightforward but becomes complex when the vehicle must have the capability to both hover and fly, particularly where motion of the fluid medium may be irregular and/or unpredictable. These complexities are compounded by the fact that effectiveness of both control modalities are oppositely affected and in different degrees by vehicle speed through the fluid medium and the fact that use of thrusters is much more expensive in terms of energy use than use of control surfaces.

More specifically, the traditional approach to this problem has been to design a set of control laws or rules appropriate to the flying regime and another set of laws or rules appropriate to the hovering regime and then to provide a strategy or method to handle the transition from one regime to the other. In general, a preferred strategy has been to simply provide switching from on control regime to the other at a particular threshold speed which is generally set as low as possible consistent with effectiveness of control surfaces at the threshold speed in view of the much greater energy requirements for use of thrusters. However, such an approach becomes problematic where the threshold speed is comparable to the variation in flow rate of the fluid medium; causing excessive switching or use of a control regime which is actually ineffective to provide the desired control. Setting a higher threshold speed is not a practical solution to such a problem in view of the disparity of energy requirements between control surfaces and thrusters and the greater use of thrusters implied by the higher threshold speed.

SUMMARY OF THE INVENTION

It is therefore an object of the present invention to provide a method and apparatus for achieving a single, unified control mode for a vehicle in two fundamentally different operational modes or regimes and at transition speed between those modes or regimes for achieving an optimal vehicle attitude for guidance through a maneuver.

In order to accomplish these and other objects of the invention, a system and method for optimizing guidance of a vehicle having a plurality of effectors that vary in effectiveness with vehicle speed is provided comprising means for or steps of developing an error signal for vehicle position relative to a vehicle guidance command, and attributing the error signal proportionately between translation rate error and pointing error as a function of vehicle speed and relative cost of use of respective ones of said plurality of effectors.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
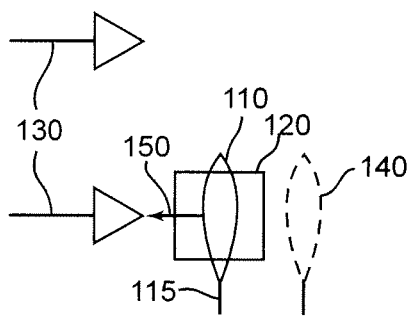
FIGS. 1A, 1B, 1C and 1D depict several basic vehicle maneuvers which will be helpful in visualizing the problem addressed by the invention and the effects of the invention as a solution thereto.

Referring now to the drawings, and more particularly to FIGS. 1A-1D, there are shown illustrations of very basic maneuvers which can be carried out by a vehicle capable of "flying" and hovering to which the present invention is directed. It should be understood that the term "flying" is used herein to denote a mode or regime of vehicle operation at a speed relative to the surrounding fluid medium for control surfaces to be at least marginally effective to produce forces for altering the attitude of the vehicle, regardless of whether the fluid medium in which the vehicle is operated is gaseous or liquid. It is also to be understood that while the invention will be explained principally with reference to a submersible vehicle, it is equally applicable to any vehicle adapted to operate in any other fluid medium such as the exemplary aircraft mentioned above. It should be appreciated that while FIGS. 1A-1D may be most readily understood as views in a vertical direction, these Figures can also be understood as a horizontal view of the same types of maneuvers in regard to altering of maintaining a depth or altitude of the vehicle 110. It should also be appreciated in this regard that variations from neutral buoyancy of the vehicle (or any imbalance between aerodynamic lift and vehicle weight will have a substantially identical ultimate effect as vertical currents or current components that may be caused by, for example, thermal gradients or flow around an obstacle and such buoyancy/lift effects should be understood as being included in any mention of vertical currents or current components hereinafter.

FIG. 1A illustrates hovering by the vehicle 110 relative to a location 120 in the presence of a lateral current 130. In the absence of any current, the vehicle 110 would ideally remain stationary relative to object 120 (which may be a particular object of interest or the like). However, the fluid medium may be somewhat turbulent or include potentially substantial and highly variable currents which will displace the vehicle 110. For purposes of this example, a lateral current 130 is assumed which, over some period of time, will displace vehicle 110 to the location 140 (depicted by dashed lines) in the absence of some corrective action. Thus, to maintain the position of vehicle 110 relative to location 120, and in the absence of effective forward motion relative to the fluid medium, rendering control surface 115 completely ineffective for control, thrusters would ordinarily be used to produce force 150 to maintain the position of vehicle 110 in whatever combination was dictated by the vehicle heading. Thus it is seen that guidance in a hovering mode is attained through control of vehicle translation rate.

Figure 1B:
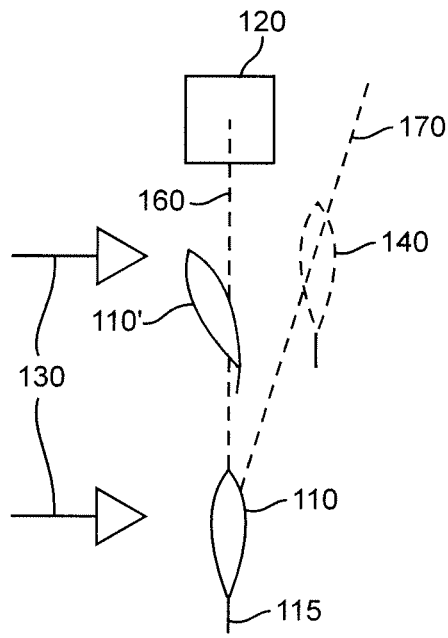

In contrast, with reference to FIG. 1B, vehicle 110 is assumed to have a sufficient forward speed sufficient for effective attitude control using control surfaces 115. In this example, the vehicle is seeking to attain position 120 along course 160. Lateral current 130 is assumed to be the same as in the example of FIG. 1A and, if control surfaces 115 are not used and given the heading illustrated at 110 the actual course attained would be approximately that indicated by dashed line 170 while the heading of the vehicle would remain the same as depicted at 140. As a correction to return the vehicle course to course 160, the control surfaces would be used to alter the heading to counteract the current as depicted at 110' such that the "course made good" coincides with course 160. Thus it is seen that guidance in a flying mode is attained through control of vehicle attitude.

Figure 1C:
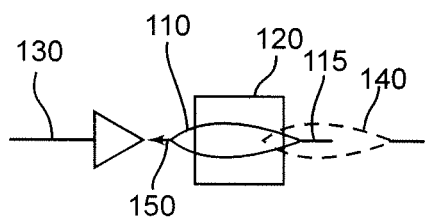

Referring now to FIG. 1C, it will be appreciated that the scenario illustrated is identical to that of FIG. 1A with vehicle 110 hovering relative to location 120 in the presence of current 130, but for the orientation of vehicle 110. That is, current 130 remains the same and, over some period of time, would displace the vehicle 110 to location 140 in the absence of corrective action. However, due to the orientation of vehicle 110 in this example, vehicle 110, while hovering, is actually in a flying mode where control surface 115 would be effective to control attitude. Thus force 150 would generally be developed through normal propulsion of the vehicle (which could also be considered as a type of thruster) but, in contrast with the example of FIG. 1A, the orientation or attitude of the vehicle and the direction of the propulsion or thruster force would be determined by the vehicle heading which is controlled by control surface 115 as in the scenario of FIG. 1B. Further, as in the scenario of FIG. 1B, guidance in a flying mode is attained through control of vehicle attitude even during hovering when the current is sufficient to support a flying mode of operation. Thus, it is seen that hovering is achieved in fundamentally different ways in the scenarios of FIGS. 1A and 1C, respectively.

Figure 1D:
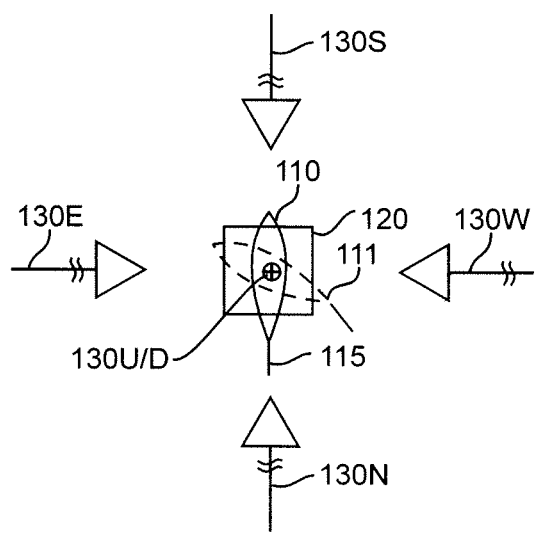

The distinctions between the scenarios of FIGS. 1A and 1C are also very basic to an understanding and appreciation of the function, operation and effects of the invention. FIG. 1D illustrates a more generalized combination of the scenarios of FIGS. 1A and 1C. In FIG. 1D, however, the orientation of vehicle 110 is intended to be substantially arbitrary (as indicated by dashed outline 111) while still similarly positioned relative to location 120. The current is also depicted as being turbulent, variable and/or arbitrary in direction as depicted by current vectors 130E, 130N, 130W and 130S of arbitrary magnitude. Therefore, the current component in the axial direction of the vehicle is not necessarily zero as was assumed in the scenario of FIG. 1A and the current component in the axial direction of the vessel 110 (e.g. vector 130S) is possibly but not necessarily sufficient to constitute "flying" as was assumed in the scenario of FIG. 1C. Thus, FIG. 1D is essentially intended to represent hovering in an environment where current may be arbitrarily variable in both direction and speed (as well as in three-dimensions with possible vertical components to the fluid currents as indicated at 130U/D). These variable current components and the relatively arbitrary attitude of vehicle 110 illustrate that desired control is not optimally achieved in accordance with a single operational mode or regime as was necessarily the case in the scenario of FIG. 1A or essentially a practical necessity in the scenario of FIG. 1C (since it is assumed that effective axial speed is such that control surfaces are fully effective for guidance while the more energy-consuming use of thruster may be much less effective for guidance, particularly as a function of cost or energy required). Thus, the invention seeks to combine or "blend" components of pointing (as in the flying regime) with translational rate (as in the hovering regime) based on speed and consequent effectiveness and economy of use of control surfaces and thrusters for achieving vehicle guidance in order to provide a unified control policy which is optimally effective over the entire range of speeds that may be achieved by the vehicle and under any conditions which may be encountered that the vehicle is designed to withstand.

Figure 2:
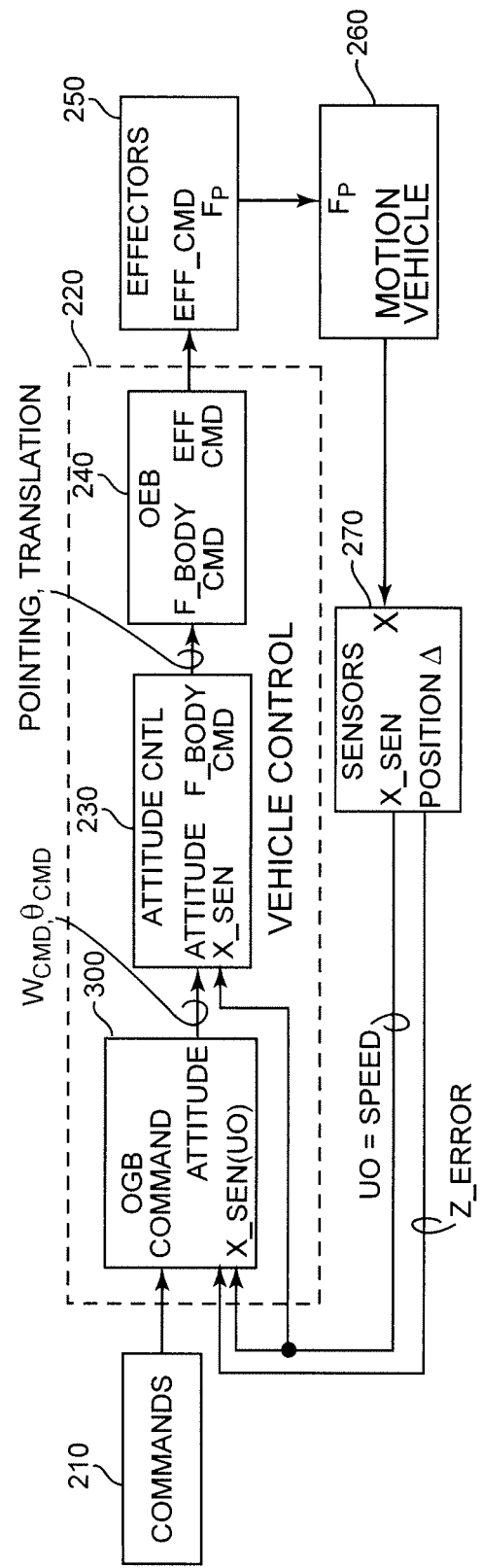
FIG. 2 is a block diagram or data flow diagram of a vehicle control system including the invention.

Referring now to FIG. 2, an implementation of the invention will now be discussed. As will be appreciated by those skilled in the art, the overall architecture depicted in FIG. 2 is generally similar to vehicle control systems which have been used in the past which employ feedback to adjust the amount of control applied as in so-called fly-by-wire systems but for inclusion of optimal effector blending (OEB) 240 appropriate to vehicles which may be controlled in both hovering and flying modes and further inclusion of optimal guidance blending (OGB) 300 in accordance with the invention and which will be discussed in greater detail below. (Accordingly, no portion of FIG. 2 is admitted to be prior art as to the present invention.)

That is, desired control commands are generated at 210 and input to a vehicle control element 220 which outputs appropriate control signals to the control surfaces and thrusters or the like, collectively referred to herein as effectors 250. The effectors cause forces to be generated which are applied to the vehicle 260 which then responds to the forces by change of motion such as attitude, speed, direction, etc. These changes in motion are detected by appropriate sensors 270 and errors between actual motion and motion corresponding to control commands 210 fed back to attitude control 230 which increases or decreases the amount of control applied to the effectors (after having been, in this case, apportioned between them by OEB 240) such that the vehicle response closely corresponds to the control commands asserted at 210 to move the vehicle to or maintain the vehicle in a desired location (referred to as "location capture").

In this regard, the optimal effector blender (OEB) mentioned above is described in detail in "Control Allocation for the X-35B" by Ken Bordlington and John Bessolo, 2002 Biennial International Powered Lift Conference, Williamsburg, Va., Nov. 5-7, 2002, published by American Institute of Aeronautics and Astronautics, has been developed by the assignee of the present invention and is a substantially mature and well-understood technology that has been used in some high performance aircraft for several years. However, no use of OEB technology in any type of water craft, particularly of the submersible type, is known to the inventors.

An OEB arrangement 240 performs the function of dynamically determining relative effectiveness of suites of thrusters and/or control surfaces and to allocate control signals between them to achieve a desired attitude change most efficiently. It has also been found that an OEB provides good control over redundant effectors, even when dissimilarly effective or even non-functional to fully or partially substitute one suite of effectors for another to achieve the best approximation of the desired control in the manner which is most efficient under the prevailing circumstances. However, the OEB must, nevertheless, receive control inputs in order to distribute appropriate (e.g. possibly zero such as for thrusters under high speed conditions) control signals to each of the effectors which may be available. Thus by using an OEB arrangement 240 which apportions control signals for effectors in accordance with fed back speed information, the attitude control laws or rules for the vehicle which are designed to request body axis forces and moments (e.g. forces along or around orthogonal axes of the vehicle) thus become invariant across the entire speed range of the vehicle. That is, particular gains and coefficients in the computations of control signals may change (e.g. with speed) but the basic laws or rules which may be embodied in an algorithm in accordance with the control laws or rules do not. In essence, the OEB uses information regarding the control effectiveness of the individual effectors, coupled with a weighting factor (e.g. reflecting the relative energy and other costs of use of individual effectors such as thrusters) to manage the utilization of all available effectors associated with the vehicle. Thus an OEB arrangement also provides a large degree of inherent fault tolerance in being capable of supplementing one effector with one or more other effectors or substituting one effector or combination thereof for another effector that may have become inoperative or ineffective due to damage or the like.

To provide control input to the OEB 240 the optimal guidance blender (OGB) 300 receives raw command data, a signal representing vehicle speed, preferably the same signal fed back to the OEB 240, and positional error data preferably derived from sensors 270 other than the speed (x) sensor. The overall desired function of the OGB is to apportion the positional error between pointing and translation rate to modify the raw command input in accordance with vehicle speed to provide separate pointing and translation rate controls to the attitude control element 230 which modifies each portion of the divided data into a F_body command containing both pointing and translation rate components or information which is then provided to the OEB 240 to apportion the commands optimally over the available effectors in accordance with speed.

The basic approach of the OGB is to exploit the fact that guidance laws or rules decouple into two orthogonal planes: one for vertical guidance and one for lateral/directional guidance. The laws for the two planes are very similar and the sole minor difference will be discussed below and derives from the convenience of using a depth command rather than an altitude command in the preferred application to submersible vehicles. Therefore, it will be sufficient to convey an understanding of the preferred implementation of the OGB to discuss its operation and principles in connection with guidance in the vertical plane with references to guidance in the horizontal plane as needed or appropriate.

The basic vertical control mode for submersible water craft is depth capture. The second most common is altitude capture which may be more familiar in regard to aircraft but is basically the same maneuver using a different reference. That is, altitude/depth control is easily accomplished with a depth controller performing the transformation:

$$D_{cmd} = D + ALT - Alt_{cmd}$$

where
$D_{cmd}$ is the commanded depth,
D is the sensed depth,
$ALT_{cmd}$ is the commanded altitude, and
ALT is the sensed altitude. Thus commands for change of altitude and change of depth are of different sign.

In the lateral/directional plane, there are two modes: a pointing mode which may be used to essentially "aim" the vehicle (e.g. at a target or for homing) and the second is track following. In the latter case, by transforming the local space into cross-track and along-track coordinates, track following becomes a horizontal position capture task and is thus nearly identical to altitude/depth capture in the vertical plane using the above transformation.

It should be noted that pointing in the vertical plane will be desirable for some maneuvers but, during hovering maneuvers, such "pitch-pointing" for altitude/depth capture is, in the absence of the invention, performed substantially less often and is generally of less importance to the probable goals of the vehicle during hovering than heading-pointing in the horizontal plane during hovering and, particularly track following, although providing a depth control loop including pitch pointing may be more common than to have a track controller which, in turn, requires a navigation system that can determine vehicle location. However, it is important to an appreciation of the invention to recall from the discussion of FIGS. 1A-1D above, that both pitch-pointing and heading pointing can have a significant impact on the efficiency of depth/altitude capture and/or horizontal position capture; either or both of which may be used in practicing the invention. As a guidance problem in the horizontal plane, pointing or aiming is trivial and is merely a matter of passing the desired heading to the attitude control. Pitch-pointing in the vertical plane is also quite simple in matching the vehicle pitch to the desired trajectory.

The preferred OGB approach is based on the fact that the rate of change of depth D' (e.g. generally a time derivative of depth) is given by $$D'=w*\cos(\theta)-u*\sin(\theta)$$

where
  u is the velocity of the vehicle along its axis,
  w is the vehicle velocity normal to its axis (in the vertical planer, and
  θ is the pitch angle. For relatively small pitch angles, the rate of change of depth can be approximated by $$D'=w-(u*\theta).$$

It should be noted that a similar relationship holds for lateral translation rate, substituting heading deviation (e.g. the difference in heading between, for example 110' and 140 in FIG. 1B required to achieve the desired course-made-good) for pitch with a sign change and substituting lateral velocity for normal velocity (e.g. normal to the longitudinal vehicle axis in a horizontal plane). Specifically, letting Y' be the time derivative of lateral position Y in a locally level coordinate system and letting v be the lateral velocity and t be the heading relative to the x-axis in the locally level system:

$$Y'=v*\cos(\psi)+u*\sin(\psi).$$

Note that this equation differs from the above (vertical plane) analysis by the different sign on the u term. Thus, similarly to the above analysis, for small angles:

$$Y'=v+(u*\psi)$$

Figure 3:
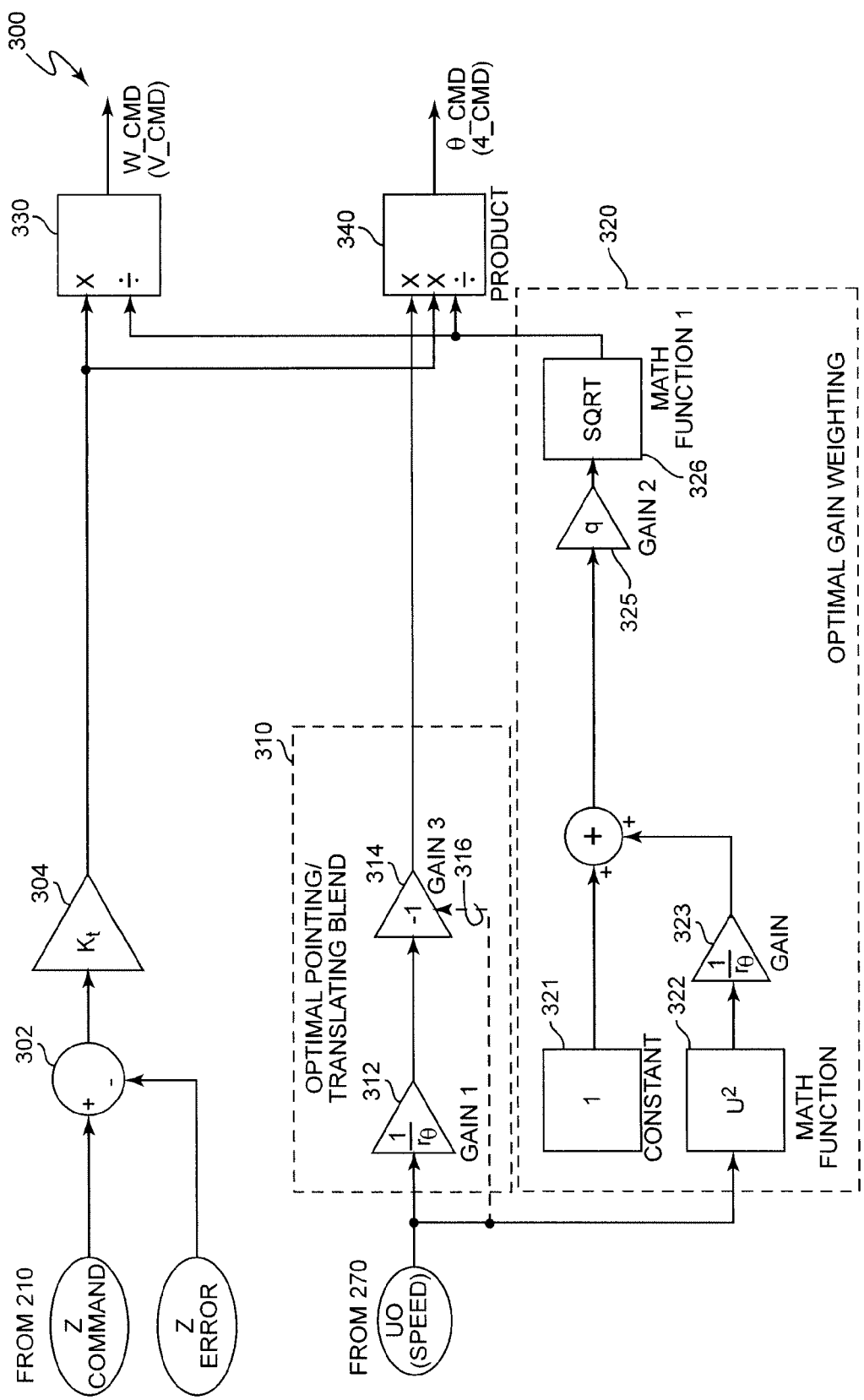
FIG. 3 is a detailed schematic diagram or data flow diagram of portions of the vehicle control system of FIG. 2 for vertical and/or lateral guidance in accordance with the invention.

It is important to an understanding of the principles of the preferred embodiment of the invention to note that optimal guidance blending can be achieved and apportioning of error correction control between pointing and rate of translation made optimal by virtue of the fact that this relationship, for each of the vertical and horizontal planes, can be expressed as a state-space dynamic equation for depth and heading control, respectively. By defining two weighting terms, $K_W$ and $K_\theta$, which define the relative "cost" of using pointing (pitch or heading) control principally involving use of less "expensive" control surface effectors and/or translation rate control involving use of thrusters having greater energy requirements as effectors, apportioning control between pointing and translation rate can be achieved. That is, the control can be made optimal to apportion control between pitch/heading deviation control and translation control because the ratio (e.g. $r_\theta=K_\theta/K_W$) determines the relative cost of pointing and translating and will be substantially invariant with speed (variation in relative effectiveness of effectors with speed is preferably applied as a separate gain weighting as is illustrated in FIG. 3 (branch 320) as discussed below). Thus, it can be shown that the optimal blending control in response to an error, $e_z$, is:

$$P=\text{sqrt}(1/(1/K_W+u^2/K_\theta))$$

$$w_{cmd}=(1/K_W)*P*e_z$$

$$\theta_{cmd}=(-u/K_\theta)*P*e_z.$$

Similarly for the horizontal guidance case:

$$P=\text{sqrt}(1/(1/K_v+u^2/K_\psi))$$

$$v_{cmd}=(1/K_v)*P*e_y$$

$$\psi_{cmd}=(u/K_\psi)*P*e_y$$

(note the different sign on the u term relative to the vertical guidance case) where $K_v$ is the cost of lateral translation and $K_\psi$ is the cost of horizontal or heading pointing.

It can be seen from inspection of these equations that the control is driven to a pure translational mode at zero forward velocity and, in compensation for such reduced translation rate control, to dominantly pitch or heading pointing mode at higher velocities while transitioning between those modes at rates which are proportional to the relative costs of use of thrusters and control surfaces. Further, as a perfecting feature of the invention which is desirable but not necessary to practice of the invention in accordance with its basic principles, since translational mode is reduced quickly (due to its much larger relative cost) as speed increases, a modification of the above equations to "disallow" translation commands above an arbitrarily selected speed to prevent wasteful residual thruster activity is considered to be desirable. (Forces derived from control surfaces will inherently be increased through error feedback to compensate for the disallowed thruster activity.) Conversely, the use of control surfaces or pointing control can be eliminated below a similar arbitrary speed threshold. For any reasonable choice of speed above which thruster activity is disallowed, relatively minimal thruster forces will be involved and such a modification does not alter the validity of the control mode in the above analyses. The same is true for control surfaces below a similar speed.

The overall response of the system is set by a total gain $K_t$. The resulting guidance laws are:

$$w_{cmd}=K_t*\text{sqrt}((1/K_W)/(1+u^2/r_\theta))*e_z$$

$$\theta_{cmd}=K_t*(=u/r_\theta)*\text{sqrt}((1/K_W)/(1+u^2/r_\theta))*e_z$$

for vertical guidance and $$v_{cmd}=K_t*\text{sqrt}((1/K_v)/(1+u^2/r_\psi))*e_y$$

$$\psi_{cmd}=K_t*(u/r_\psi)*\text{sqrt}((1/K_v)/(1+u^2/r_\psi))*e_y$$

for horizontal guidance. Particularly since the last two terms in both equations of each set of guidance laws are the same, these control command modifications of the raw control command data can be implemented using the relatively simple OGB circuit 300 depicted in FIG. 3, as will now be explained.

The raw control data from an operator on board the vessel or a remote control arrangement (in which the present invention provides particularly distinct advantages) 210 and a positional error signal from sensors 270 are input to an adder 302 which modifies (e.g. subtracts) the error from the command signal. The resulting modified/corrected command signal is then further modified by gain $K_t$ at 304 and the result supplied to multipliers 330 and 340. The speed information $u_o$ upon which basis the commands are apportioned between pointing and translation rate is input from the speed sensor (among sensors 270), is processed through a separate branch of the OGB and, itself, comprises two branches 310 and 320.

In branch 310, gain $1=1/r_\theta$ is applied at 312 and the result made negative (gain 3) 314 and that result applied to multiplier 340. (Negating is omitted the horizontal guidance case or where an altitude rather than a depth reference/command is used but gain 3, 314, may be retained (e.g. gain 3=+1 or 0) for disallowing thruster control above an arbitrary speed.) It should be noted that the use of $r_\theta$ or $r_\psi$, and the fact that it appears in the denominator is arbitrary; $r_W$ and/or $r_v$ could be defined and the inverses of the ratios defined above and used in place of the 1/r terms. It should be noted that substantially complementary phasing in and phasing out of thruster and control surface blending at a rate governed by gain 1, based on relative cost between use of respective effectors results from the closed-loop feedback of error signals as effectors which are more costly to use is phased out with speed and, conversely, the more costly use of thrusters is phased in as speed is reduced and pointing becomes less effective. Thus it will be appreciated by those skilled in the art that, while the organization of OGB 300 is preferred and directly controls only pointing with complementary translation rate control being achieved through closed-loop feedback, other arrangements could be used such as inversion of gain 3 and applying the output of branch 310 to multiplier 330 or other arrangements involving both multipliers 330 and 340 and appropriate modifications to branch 310 could be used to obtain varying functions and degrees of complementarity of response in allocation between pointing and translation rate guidance. In any case, disallowing thruster activity above a threshold speed (or control surface activity below a threshold speed) can also be easily controlled at gain 3, 314, by driving gain 3 to zero at a threshold speed as depicted by dashed line 316.

In branch 320 which provides near-optimal gain weighting as a function of speed to approximate relative effectiveness (as distinct from cost of use) of respective effectors, the speed, u, is squared at 322 (the effectiveness of respective types of effectors tends to increase or decrease as the approximate square of the speed) and the result altered by gain=$1/r_\theta$ and added, at 324, to a constant (e.g. =1) provided from 321. This result is then, optionally, modified by gain, q=$1/K_W$ or $1/K_v$, 325. The square root of the result is taken at 326 and the result applied to both multipliers 330 and 340 as a reciprocal indicated by a "÷" input label; the respective outputs of which are $w_{cmd}$ and $\theta_{cmd}$ (of $_{vcmd}$ and $\psi_{cmd}$+ for horizontal guidance) define the desired attitude and position change for the vehicle and which are adjusted for errors in position and attitude. These signals are then applied to attitude control 230 which provides pointing and translation commands to the OEB 240 discussed above which provides suitable control signals to the suites of effectors to achieve the maneuver or error correction corresponding to the guidance command 210.

Figure 4:
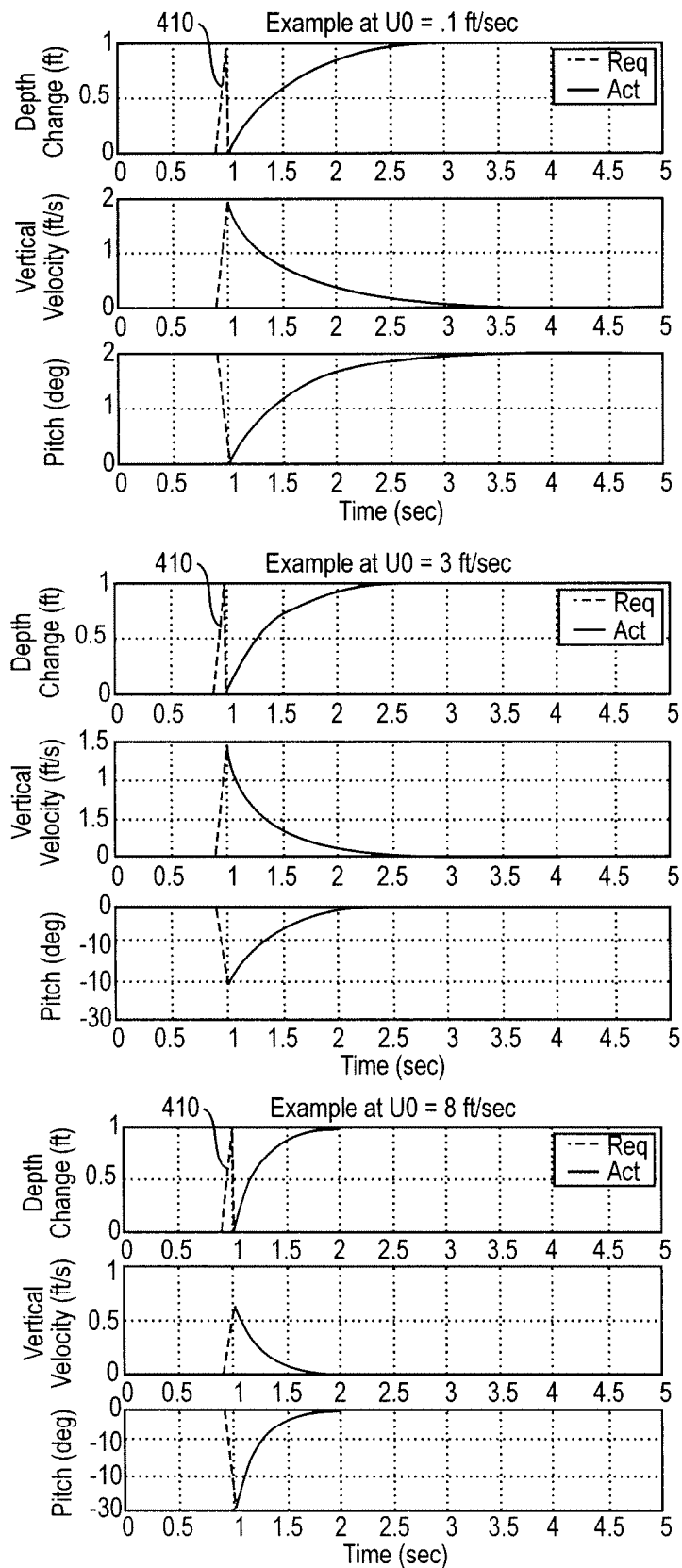
FIG. 4 illustrates three families of graphs depicting change of vehicle pitch, vertical velocity and depth/altitude change of a vehicle at minimal/hovering transitional speed, high transitional speed and an intermediate transitional speed for a given control command or signal in accordance with the invention.
Figure 5:
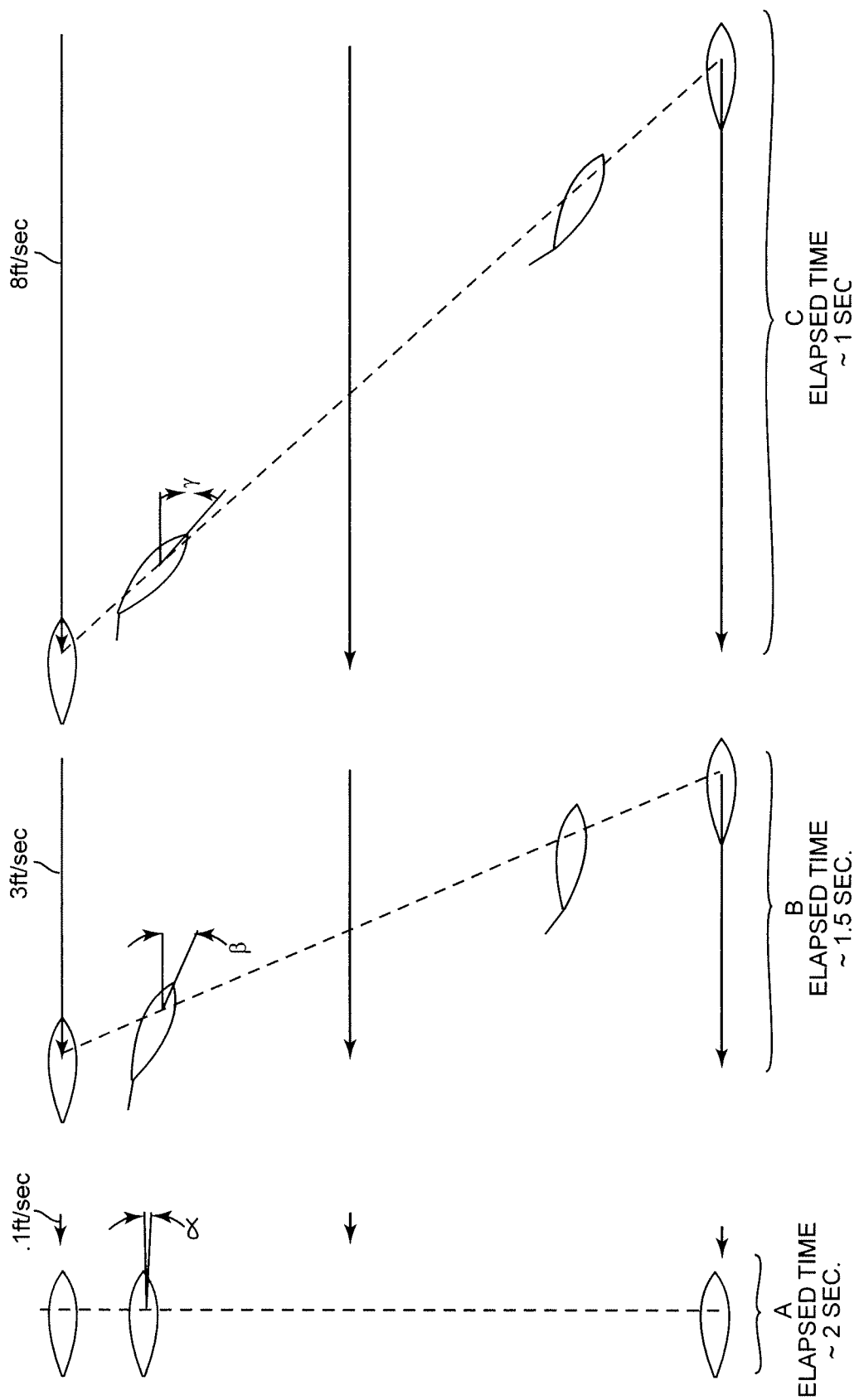
FIG. 5 illustrates the vehicle motions achieved by the invention corresponding to the respective families of curves of FIG. 4.

The efficacy of the present invention to apportion guidance commands and position/attitude error corrections between pointing and translation rate is graphically illustrated in FIG. 4. FIG. 5 may assist in visualizing the vehicle motions depicted by the graphs of FIG. 4. FIG. 4 contains three families of curves A, B and C representing response of a vehicle employing the system of the invention at three markedly different speeds but which are all within the transitional speed range where effectiveness of both control surfaces and thrusters are reduced to different degrees. Curve families A and C represent speeds near the effective limits of the transitional speed range although all effectors (depending on particulars thereof) will retain some effectiveness at any finite speed. It should be observed that in all three cases the vehicle can be understood to be stationary and hovering with the speed attributable to current. However, in practice, it is irrelevant whether the speed is attributable to current, vehicle motion or a combination thereof. The curves in each family represent depth change (e.g. overall response), vertical velocity (e.g. translation) and pitch (e.g. pointing) for a given vertical movement command in the absence of any other controls such as for attitude being exerted indicated by the same sharply rising or falling linear region 410 in each family of curves. (The scales differ for the vertical velocity and pitch curves between the curve families.) While the depth change can be accomplished more quickly if the vehicle speed is higher, the actual depth change (of one foot in these examples) is otherwise identical regardless of vehicle speed and the initial and final vehicle attitudes being the same in all cases while the apportionment of control between pitch/pointing varies between a maximum of 1° at very low speed to a maximum of 30° at high speed (and gradually returns to 0° in either case as the final desired position is approached and the depth error approaches zero) while the vertical (translational, i.e. attributable to vertical thrusters) velocity varies between a maximum of about 1.7 ft/second at low speed to only about 0.6 ft/second at higher speed (and gradually returning to zero as the target depth is approached). With reference to actual vehicle behavior, as illustrated in FIG. 5, at low speed (case A corresponding to curve family A), the depth change is accomplished almost entirely by thrusters with only a small angle, α, of pitch pointing (e.g. substantially corresponding to FIG. 1A with only a small amount of blending of the motion of FIG. 1C). At intermediate speeds as shown in case B, corresponding to curve family B the vehicle motion is an approximately equal blending of the motions shown in FIGS. 1A and 1C with much increased pitch-pointing angle, β, but which is not so great as to bring the axis of the vehicle into alignment with vehicle motion through the current (e.g. the vector sum of vehicle motion and current) and using thrusters to a substantial degree. At high speed, however, the vehicle motion is substantially that of FIG. 1C where the pitch-pointing angle, γ, is substantially aligned with vehicle motion through the current and thruster usage is much reduced. (A threshold difference between γ and actual vehicle trajectory could also be easily used to disallow thruster activity.) Therefore, it is clear that the present invention is effective to provide a consistent response across the entire speed range of the vehicle since a consistent response is provided across the transitional speed range and control in either the hovering or flying regime is straight forward as noted above. Further, in the transition range, the OGB and the overall system provide blending in of pitch and blending out of translation as speed increases.

In view of the foregoing, it is clear seen that the present invention provides a method and apparatus for achieving a single, unified control mode for a vehicle in two fundamentally different modes or regimes and at transition speed for achieving an optimal vehicle attitude for guidance through a maneuver. The invention is deemed particularly suitable for unmanned submersible vehicles but is equally applicable to a wide variety of vehicles including aircraft, ground effects machines and vehicles of any type controlled by an on-board operator since recapture of a changed depth or track can be achieved with a simple depth or heading and the invention will assure that the maneuver or correction of any error will be achieved most efficiently regardless of effective vehicle speed. It should also be appreciated from the foregoing that the invention is considered to be particularly advantageous for unmanned vehicles and, whether the vehicle is controlled by an in-vehicle operator or remotely controlled, the invention can be advantageously applied for vehicle guidance in either the vertical or horizontal planes, or both, to achieve a unified and consistent guidance over the entire speed range of the vehicle.

While the invention has been described in terms of a single preferred embodiment, those skilled in the art will recognize that the invention can be practiced with modification within the spirit and scope of the appended claims.

Having thus described my invention, what we claim as new and desire to secure by Letters Patent is as follows:

1. A system for optimizing guidance of a vehicle having a plurality of effectors that vary in effectiveness with vehicle speed relative to a fluid medium through which said vehicle can move, said system including a sensor for developing an error signal for vehicle position relative to a vehicle guidance command, an optimal effector blender means to dynamically determine relative effectiveness of said effectors and to allocate control signals between said effectors to achieve a desired attitude change most efficiently, and an optimal guidance blender to attribute said error signal proportionally between translation rate error and pointing error as a function of said vehicle speed and relative cost of use of respective ones of said plurality of effectors such that vehicle attitude during a change in position corresponding to said error signal for vehicle position is determined in accordance with said vehicle speed relative to said fluid medium and said change in position is accomplished using translation rate in proportion to thruster effectiveness at said vehicle speed.

2. A system as recited in claim 1 further comprising an optimal effector blender for generating control signals for respective types of effectors in response to said means for attributing said error signal proportionally between translation rate error and pointing error.

3. A system as recited in claim 2, further comprising means for multiplying or dividing data representing said vehicle speed by a ratio of cost of use of respective types of effectors.

4. A system as recited in claim 3, further comprising means for multiplying or dividing the square of data representing said vehicle speed by a ratio of cost of use of respective types of effectors and adding a constant to obtain a result.

5. A system as recited in claim 4, further comprising means of determining a square root of a reciprocal of said result to form a second result, and means for applying said second result as a scaling factor to said error signal.

6. A system as recited in claim 2, further comprising means for multiplying or dividing the square of data representing said vehicle speed by a ratio of cost of use of respective types of effectors and adding a constant to obtain a result.

7. A system as recited in claim 6, further comprising means for determining a square root of a reciprocal of said result to form a second result, and means for applying said second result as a scaling factor to said error signal.

8. A system as recited in claim 1, further comprising means for multiplying or dividing data representing said vehicle speed by a ratio of cost of use of respective types of effectors.

9. A system as recited in claim 8, further comprising means for multiplying or dividing the square of data representing said vehicle speed by a ratio of cost of use of respective types of effectors and adding a constant to obtain a result.

10. A system as recited in claim 9, further comprising means of determining a square root of a reciprocal of said result to form a second result, and means for applying said second result as a scaling factor to said error signal.

11. A method for optimizing guidance of a vehicle having a plurality of effectors that vary in effectiveness with vehicle speed relative to a fluid medium through which said vehicle can move, said method including steps of developing an error signal for vehicle position relative to a vehicle guidance command, dynamically determining relative effectiveness of said effectors and allocating control signals between said effectors to achieve a desired attitude change most efficiently and attributing said error signal proportionally between translation rate error and pointing error as a function of said vehicle speed and relative cost of use of respective ones of said plurality of effectors such that vehicle attitude during a change in position corresponding to said error signal for vehicle position is determined in accordance with said vehicle speed relative to said fluid medium and said change in position is accomplished using translation rate in proportion to thruster effectiveness at said vehicle speed.

12. A method as recited in claim 11 further comprising a step of generating control signals for respective types of effectors in response to said means for attributing said error signal proportionally between translation rate error and pointing error.

13. A method as recited in claim 12, further comprising a step of multiplying or dividing data representing said vehicle speed by a ratio of cost of use of respective types of effectors.

14. A method as recited in claim 13, further comprising step of multiplying or dividing the square of data representing said vehicle speed by a ratio of cost of use of respective types of effectors and adding a constant to obtain a result.

15. A method as recited in claim 14, further comprising steps of determining a square root of a reciprocal of said result to form a second result, and means for applying said second result as a scaling factor to said error signal.

16. A method as recited in claim 12, further comprising a step of multiplying or dividing the square of data representing said vehicle speed by a ratio of cost of use of respective types of effectors and adding a constant to obtain a result.

17. A method as recited in claim 16, further comprising steps of determining a square root of a reciprocal of said result to form a second result, and applying said second result as a scaling factor to said error signal.

18. A method as recited in claim 11, further comprising a step of multiplying or dividing data representing said vehicle speed by a ratio of cost of use of respective types of effectors.

19. A method as recited in claim 18, further comprising a step of multiplying or dividing the square of data representing said vehicle speed by a ratio of cost of use of respective types of effectors and adding a constant to obtain a result.

20. A method as recited in claim 19, further comprising steps of determining a square root of a reciprocal of said result to form a second result, and applying said second result as a scaling factor to said error signal.

* * * * *